(12) United States Patent
Stacohiotti

(10) Patent No.: US 7,850,135 B2
(45) Date of Patent: Dec. 14, 2010

(54) INCLINATION ADJUSTING DEVICE

(75) Inventor: Franco Stacohiotti, Loreto (IT)

(73) Assignee: Euromet s.r.l., Loreto (AN) (IT)

( * ) Notice: Subject to any disclaimer, the term of this patent is extended or adjusted under 35 U.S.C. 154(b) by 0 days.

(21) Appl. No.: 12/392,359

(22) Filed: Feb. 25, 2009

(65) Prior Publication Data

US 2009/0250578 A1   Oct. 8, 2009

(30) Foreign Application Priority Data

Apr. 8, 2008   (IT) .......................... AN2008A0015

(51) Int. Cl.
*E04G 3/00*   (2006.01)
(52) U.S. Cl. .................................... 248/284.1
(58) Field of Classification Search ............. 248/284.1, 248/285.1, 286.1, 291.1, 292.14, 297.21
See application file for complete search history.

(56) References Cited

U.S. PATENT DOCUMENTS

| | | | | |
|---|---|---|---|---|
| 5,941,497 A * | 8/1999 | Inoue et al. ................. | 248/514 |
| 6,450,467 B2 * | 9/2002 | Timm ....................... | 248/284.1 |
| 7,497,408 B2 * | 3/2009 | Lim et al. ................. | 248/284.1 |
| 7,513,474 B2 * | 4/2009 | Anderson et al. ......... | 248/284.1 |
| 7,530,541 B2 * | 5/2009 | Wang et al. .............. | 248/284.1 |
| 7,562,852 B2 * | 7/2009 | Wang ....................... | 248/285.1 |
| 2008/0258029 A1 * | 10/2008 | Zhang ...................... | 248/284.1 |
| 2009/0159768 A1 * | 6/2009 | Oh ........................... | 248/284.1 |
| 2009/0206221 A1 * | 8/2009 | Timm et al. .............. | 248/284.1 |

* cited by examiner

*Primary Examiner*—Ramon O Ramirez
(74) *Attorney, Agent, or Firm*—Boyle Fredrickson, S.C.

(57) ABSTRACT

Device for adjusting and controlling the inclination of an object with respect to a given support, comprising at least one plate pivotally connected to a base through at least one arm which is pivoted at said base and coupled, at the end opposite that connected to said plate, to inclination adjusting means; said inclination adjusting means comprise a pin which is movable along a plane perpendicular to the oscillation plane of said arm and along a direction perpendicular to the direction of said pivot, said pin being provided with suitable guide means and drive means and being coupled to the free end of said arm through suitable means.

13 Claims, 5 Drawing Sheets

INCLINATION ADJUSTING DEVICE

CROSS-REFERENCE TO RELATED APPLICATION

The present invention claims priority of Italian Patent No. AN2008A000015, filed on Apr. 8, 2008.

BACKGROUND OF THE INVENTION

The present invention relates to devices used for adjusting the inclination of an object with respect to a given support means, and particularly it relates to a device to adjust the inclination on a micrometer scale.

The problem of adjusting and controlling the inclination of an object with respect to a given support means has been encountered in many fields of the art; however, for applications in the field of multimedia recording and reproduction systems, said problem is particularly significant because, in this field, it is often required to combine very accurate precision specifications with support solidity and strength specifications. Because of these specifications, the production costs for this type of devices are generally quite high, making very difficult to use them on a wide scale.

Particularly, achieving an acceptable adjustment in terms of accuracy and stability is complicated when it is required to adjust the inclination with respect to different planes. Adjustment systems based on spherical joints have the advantage of providing a range of wide adjustments, but they give neither a great accuracy nor a particular stability, because clamping a spherical joint is considerably difficult to be performed and poorly steady. Particularly, it is almost impossible to dispose objects having a considerable weight on this type of devices in the practice; furthermore, a good adjustable spherical joint still has very high production costs.

On the other hand, however, using gear systems such as conical pairs or toothed wheels and endless screws has manufacturing complications without enabling a high degree of accuracy of adjustment.

BRIEF DESCRIPTION OF THE INVENTION

The aim of the present invention is to provide an inclination adjusting device which is able to overcome the problems of systems known in the art, which can be produced in a simple and inexpensive way from a manufacturing point of view, and which is able to ensure a high accuracy of adjustment and locking stability.

Therefore, the object of the present invention is a device for adjusting and controlling the inclination of an object with respect to a given support, comprising at least one plate pivotally connected to a base through at least one arm which is pivoted at the base itself and coupled, at the end opposite to that connected to said plate, to inclination adjusting means; said inclination adjusting means comprise a pin which is movable along a plane perpendicular to the oscillation plane of said arm and along a direction perpendicular to the direction of said pivot, said pin being provided with suitable guide and drive means and being coupled to the free end of said arm.

In an embodiment, said drive means comprise a female thread integral to said pin, the axis thereof being perpendicular to said pin, which female thread is coupled to a screw which is operable by hand or by a motor. Moreover, said female thread can be advantageously formed in the body itself of the pin. The guide means can comprise a slot arranged in a plane parallel to the oscillation plane of said arm and oriented perpendicularly to said pivot.

The coupling means between said pin and the free end of said arm can comprise a slit cooperating with the end of said pin and substantially orientated along the vertical axis of the arm itself. Preferably, the said slit is oriented along a direction which is slightly inclined in respect of the vertical axis of the said arm.

In a preferred embodiment, said device comprises a bracket whose upright arms are both pivoted at said base and whose middle plane forms said plate; in this case, said pin is coupled to the free ends of both upright arms of said bracket.

Advantageously, said device comprises a further plate pivotally connected to the base itself, said further plate being arranged diametrically opposite said at least one plate and being pivoted with respect to a plane orthogonal to the plane of said at least one plate, said second plate being provided with the same inclination adjusting and controlling means.

In another embodiment, each plate can be provided with a rod axially connected at an end with the plate; the end of the said rod opposite to that connected to the said plate can be inserted into locking means positioned on the structure that has to be connected to the inclination adjusting device.

BRIEF DESCRIPTION OF THE DRAWINGS

Other advantages and features of the device according to the present invention will be apparent from the following detailed description of a preferred embodiment thereof, which is provided by way of illustration, and not by way of limitation, with reference to the accompanying drawings, wherein.

DETAILED DESCRIPTION OF THE INVENTION

Figure 1:
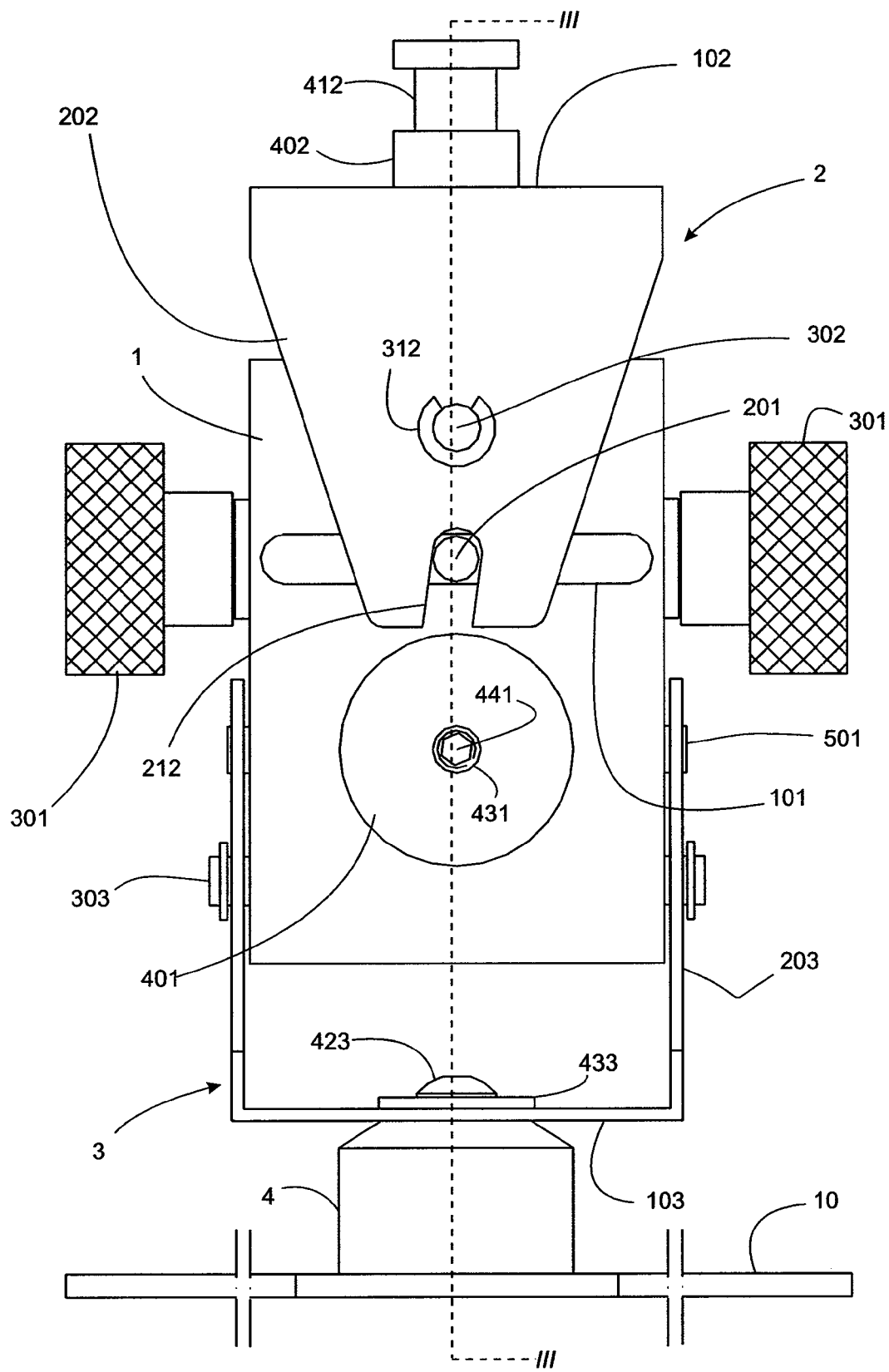
FIG. 1 is a side elevational view of a preferred embodiment of the device according to the present invention.

FIG. 1 illustrates a preferred embodiment of the device according to the present invention; reference numeral 1 denotes the body of the base of the device. A first bracket 2 is pivotally connected to said body through a shaft 302, provided with locking means 312, which is coupled to an arm 202 of said bracket 2; the bracket 2 comprises a plate 102 to which is axially connected a cylindrical plug 402, provided with an annular groove 412. The free end of the arm 202 of the bracket 2 has an U-shaped slit 212, slightly inclined in respect of the vertical axis of the said arm 202, cooperating with the pin 201 disposed in a slot 101 formed in a wall of the base 1; said pin 201 is movable along said slot 101 and operated through knobs 301, as better illustrated and described below.

The opposite end of the base is connected to a second bracket 3 comprising two upright arms 203 and a plate 103; said bracket is pivotally connected to the base 1 through a shaft 303, provided with locking means 313, and the free ends of its arms 203 cooperate with a pin 501 in a similar fashion as previously described for the bracket 2; the shafts 302 and 303 are arranged along mutually perpendicular directions, as the pins 501 and 201 and the respective drive means are, i.e. the knobs 401 and 301. The knob 401 shows a central threaded hole 431 in which a nut 441 is inserted. The plate 103 is connected, similarly as the plate 102, to a plug which extends axially in respect of the said plate 103; in the figure are shown the head 423 of the said plug and a washer 433. The plug is coupled, in a manner better discussed later on, with a locking member 4, connected to the structure 10.

Figure 2:
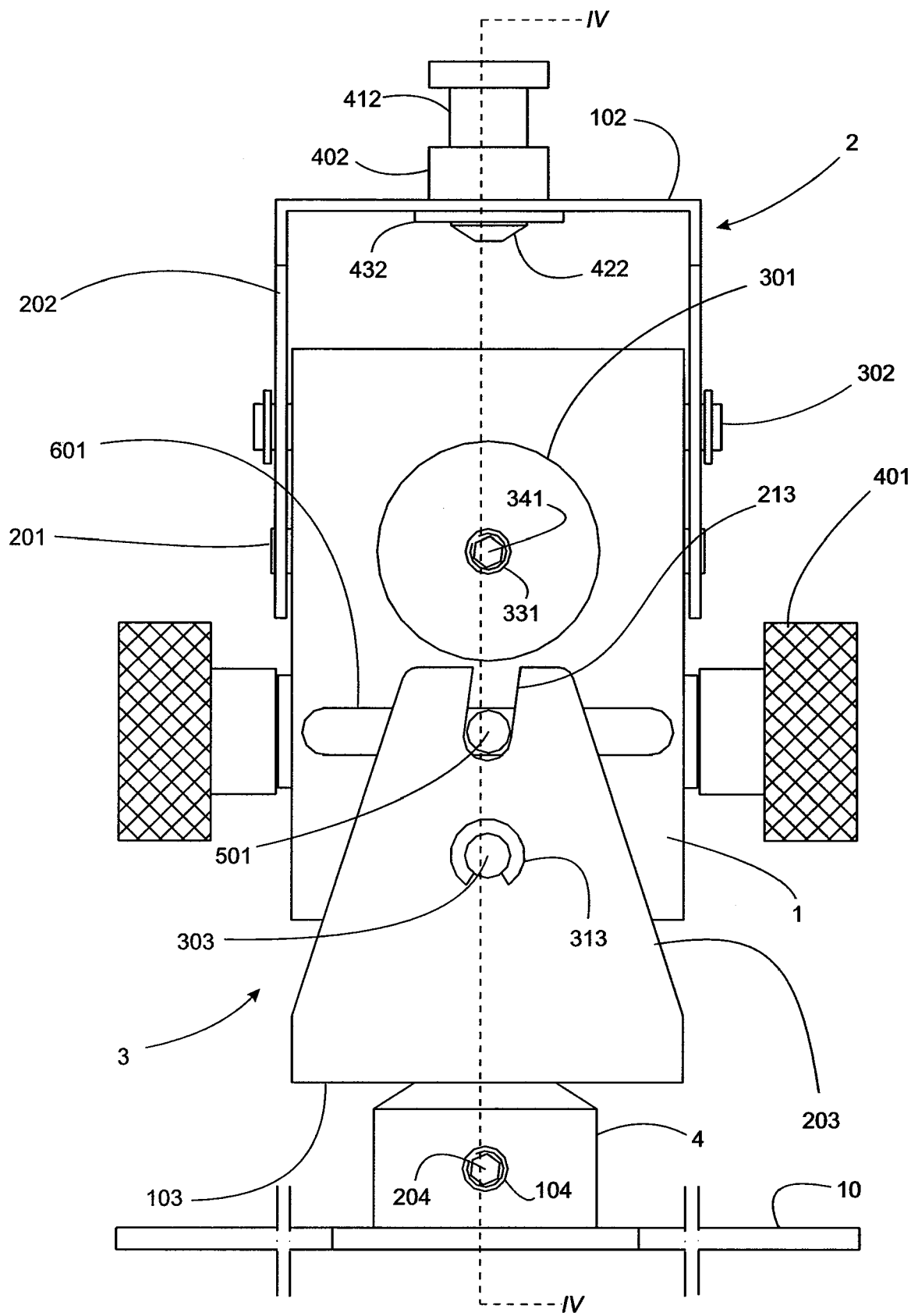
FIG. 2 is another side elevational view of the device of FIG. 1.

As it is apparent from FIG. 2, the pin 501 is also movably inserted in a slot 601 formed in the base, and the arm 203 of the bracket 3 is also provided with an U-shaped slit 213, slightly inclined in respect of the vertical axis of the arm 203, wherein said pin 501 is inserted to cooperate therewith. As described before for the knob 401, also the knob 301 is provided with a central threaded hole 331 in which a nut 341 is inserted. The locking member 4 shows a threaded hole 104 in which a nut 204 is inserted. In the figure is shown the plug 402 coupled with the plate 102, provided with the head 422 and the washer 432.

Figure 3:
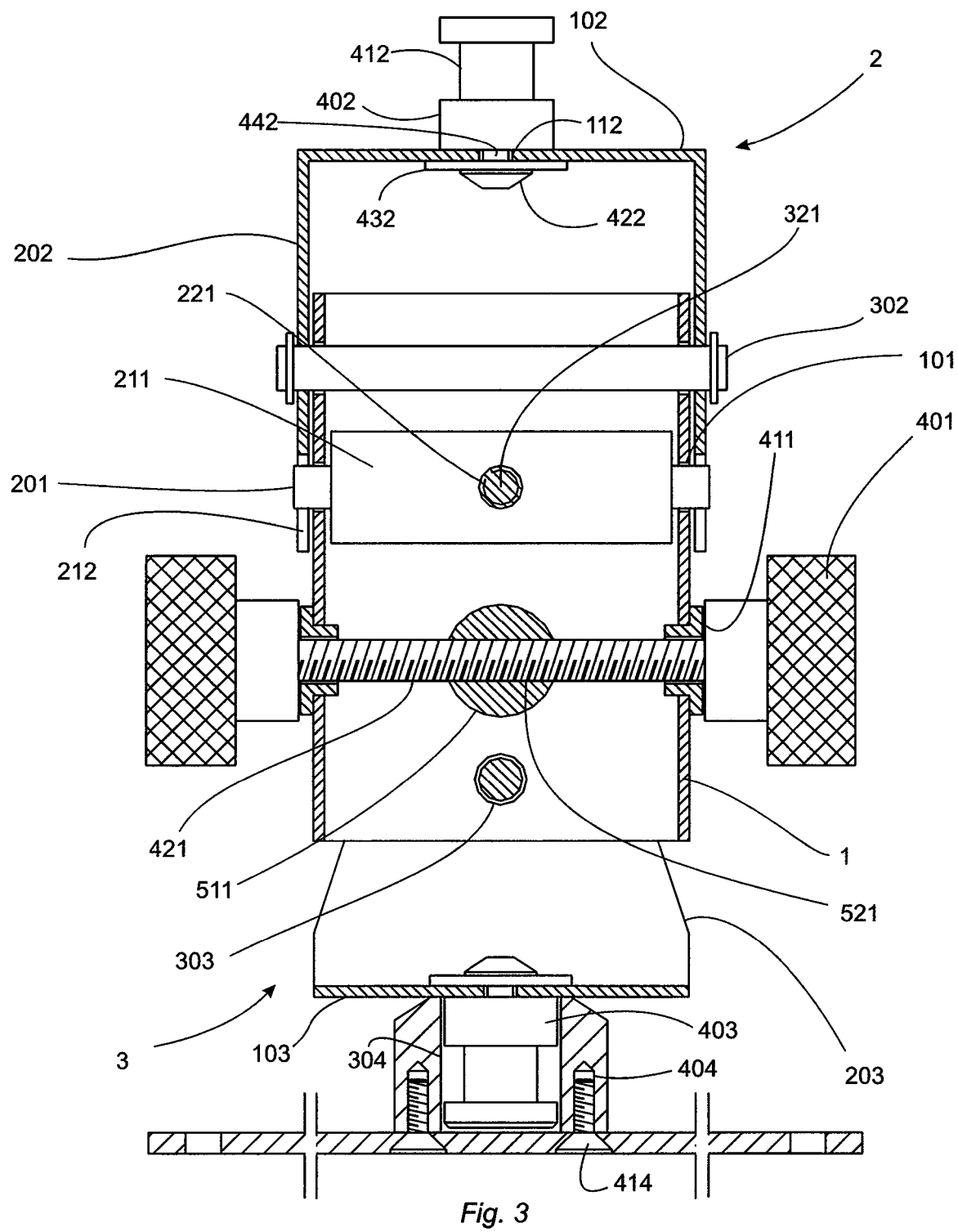
FIG. 3 is a sectional view as taken along line III-III of FIG. 1.

FIG. 3 illustrates the cross-section as taken along line III-III of FIG. 1; like reference numerals refer to like elements. The plug 402 is provided with a neck 442 passing through a hole formed in the plate 102 of the bracket 2. As can be noted, the pin 501 comprises a cylindrical body 511 wherein a threaded through-hole or female thread 521 is formed to cooperate with a threaded rod 421 having fitted knobs 401 thereon; said rod is rotatably supported with respect to the base 1 by bearings 411. The same situation can be seen for the pin 201 coupled to the bracket 2. The plug 403 is inserted in the axial cavity 304 of the locking member 4, which is connected to the structure 10 by means of the screws 414 inserted into the threaded holes 404.

Figure 4:
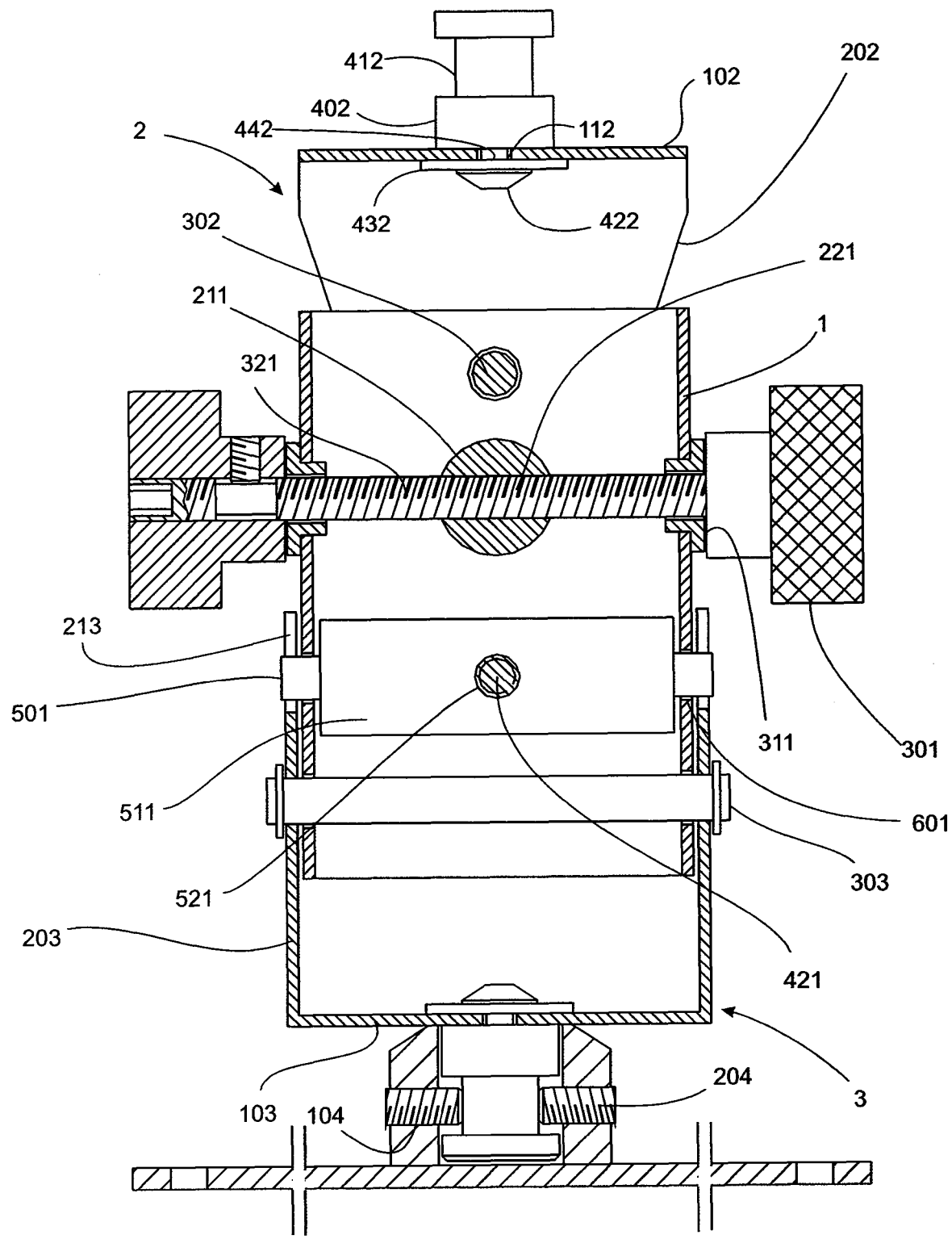
FIG. 4 is a sectional view as taken along line IV-IV of FIG. 2.

FIG. 4 shows the driving mechanism for the pin 201, as obtained by coupling the threaded rod 321 to the female thread 221 formed in the body 211 of said pin 201. The knob 301 is provided with the axial threaded hole 331 in which the nut 341 is inserted, and with a radial threaded hole in which the nut 361 is inserted. Moreover, is shown the locking of the plug 403 into the locking member 4, by means of nuts 204 inserted into the threaded holes 104 and cooperating with annular groove 413 of the said plug 403.

Figure 5A:
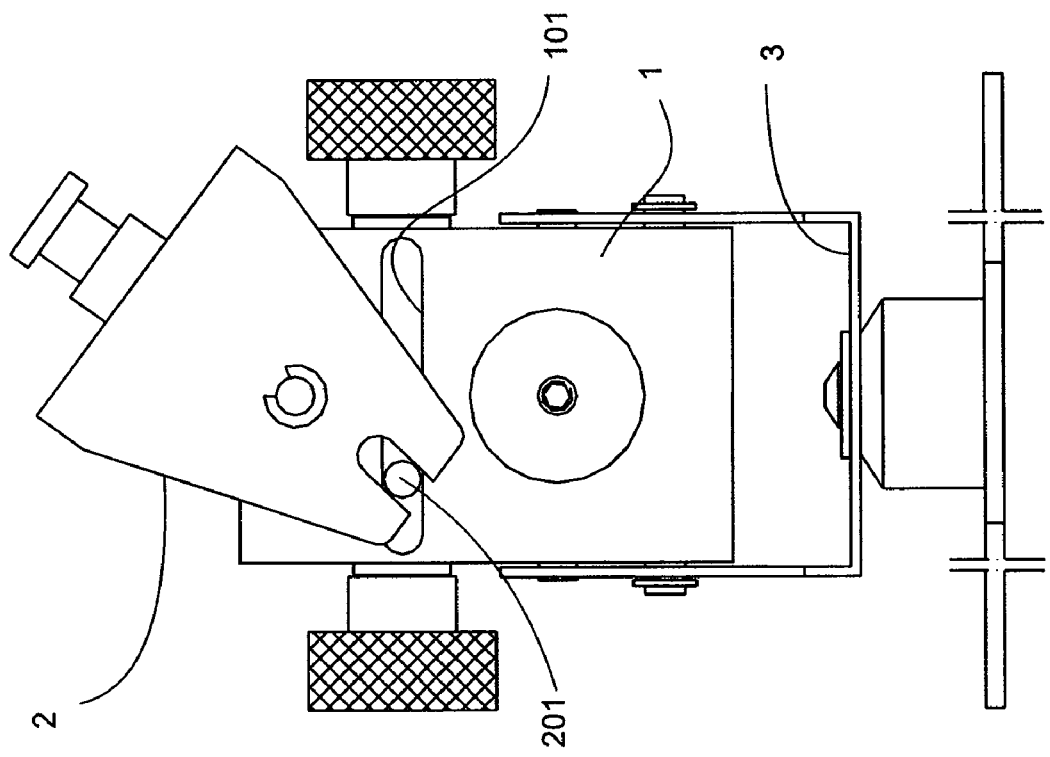
FIGS. 5A and 5B are two side elevational views of the inventive device as illustrated in an operational condition.
Figure 5B:
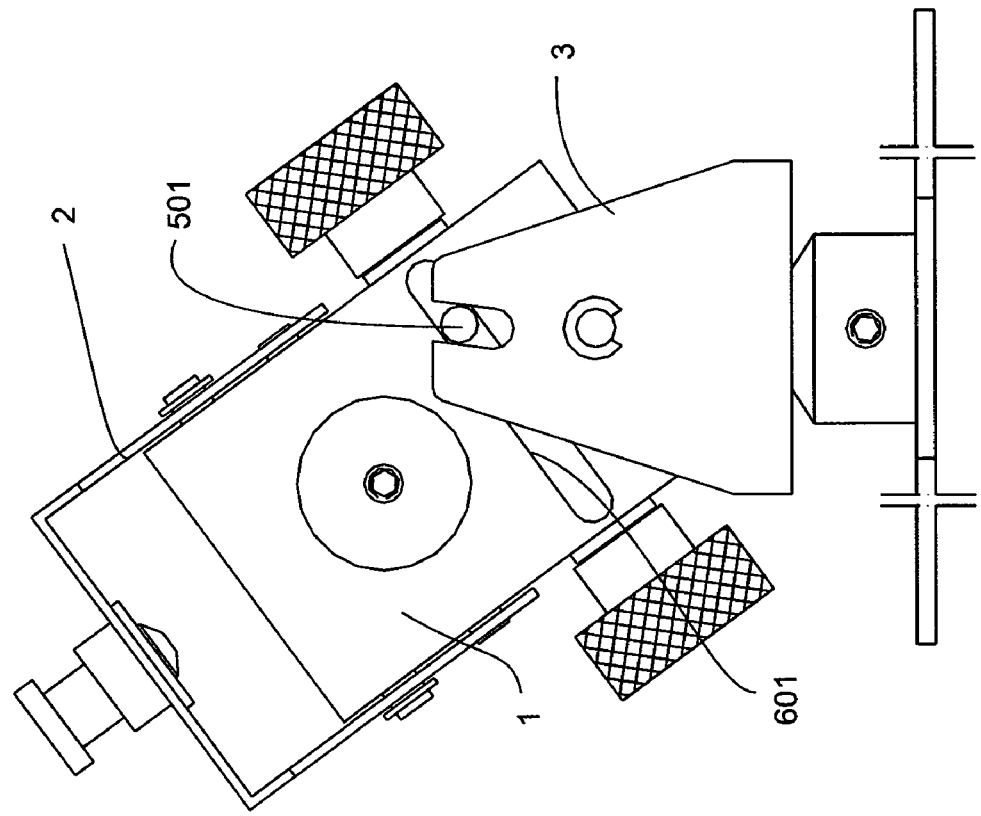

Finally, FIGS. 5A and 5B show the device according to the invention, as illustrated in two elevational views, in an operational condition, i.e. with the pins 201 and 501 being moved from the middle position along the respective slots 101 and 601.

The operation of the device according to the present invention will become apparent from the following. According to the accompanying drawings, the brackets 2 and 3, both provided with a corresponding plate 102 and 103 through which they can be connected to a support and to an object to be adjusted and controlled in inclination, are pivotally connected to the base 1 through the shafts 302 and 303. As it is illustrated the structure 10 could be connected to the plate 103 of the bracket 3 by means of the plug 403 projecting axially from the said plate 103, and coupled to the locking member 4 by means of the cooperation between the annular groove 413 of the said plug 403 and the nuts 204 inserted in the threaded holes 104 of the locking member 4. Therefore, each bracket will be pivoted by controllably moving the free ends of the arms of the brackets; as for the bracket 2, each of the two arms 202 includes, at the free end thereof, an U-shaped slit 212 which is coupled to the end of the pin 201. By rotating the knob 301, the threaded rod 321 moves the female thread 221 associated to the body 211 of the pin 201, which then slides while being guided by the slot 101 to tilt the bracket 2 by acting on the arm 202 through the slit 212. A clockwise rotation of the knob will moves the pin 201 into a direction, while a counter-clockwise rotation will move it into the opposite direction, with the minimum obtainable inclination amount being of course dependent on the screw pitch of the threaded rod and the pitch of the female thread. The operation of the knobs can be locked, by acting on the nut 341 or 441, respectively, thus preventing the rotation of the same knobs.

The width of the oscillation angle is dependent on the length of the threaded rod, the length of the slot, and the depth of the U-shaped slit in the arm of each bracket. An optimum value for the maximum inclination can be about ±45° with respect to the vertical axis of the device, however this value has not to be considered as a limiting value, because the arrangement of the device can also accommodate considerably wider oscillation angles. Advantageously, the U-shaped slit is slightly inclined in respect of the vertical axis of the said arm, so as to reduce the clearance between the same slit and the pin which is moving therein.

Clearly, the drive means as illustrated in the herein proposed embodiment are manual, however drive means such as an electrical motor, a hydraulic motor or the like could be used as well. This type of driving mechanism, comprising the utilization of a screw/female thread system, has the advantage to achieve a great stability for the chosen inclination without having to provide further locking means.

Furthermore, by disposing a further bracket 3 at the opposite end of the body of the base 1, such further bracket being pivoted in a plane perpendicular to the oscillation plane of the bracket 2, the ability of the device according to the invention to adjust and control the inclination is greatly improved. Both the adjusting and controlling assemblies are completely symmetric in construction, and this is a remarkable advantage even from a manufacturing point of view.

The robustness and accuracy of adjustment make the inventive device suitable for extremely various applications, allowing to adjust the inclination even of considerably heavy objects.

The invention claimed is:

1. Device for adjusting and controlling the inclination of an object with respect to a given support, comprising at least one plate pivotally connected to a base through at least one arm which is pivoted at said base and coupled, at the end opposite to that connected to the said plate, to inclination adjusting means, characterized in that said inclination adjusting means comprise a pin which is movable along a plane perpendicular to the oscillation plane of said arm and along a direction perpendicular to the direction of said pivot, said pin being provided with suitable guide means and drive means and being coupled to the free end of said arm through suitable means.

2. Device according to claim 1, wherein said drive means comprise a female thread integral to said pin, the axis thereof being perpendicular to said pin, said female thread being coupled to a threaded rod which is properly supported in said base and provided with handling means.

3. Device according to claim 2, wherein said female thread is formed in the body of the pin.

4. Device according to claim 2, wherein said handling means comprise at least one knob fitted to an end of said threaded rod and manually operable.

5. Device according to claim 2, in which the said handling means are provided with locking means for preventing the movement of the said threaded rod.

6. Device according to claim 1, wherein said guide means comprise a slot arranged in a plane parallel to the oscillation plane of said arm and oriented perpendicularly to said pivot.

7. Device according to claim 1, wherein the coupling means between said pin and the free end of said arm comprise a U-shaped slit cooperating with the end of said pin and oriented along the vertical axis of said arm.

8. Device according to claim 1, wherein the coupling means between said pin and the free end of said arm comprise a U-shaped slit cooperating with the end of said pin and oriented with a slight inclination in respect of the vertical axis of said arm.

9. Device according to claim 8, wherein said pin is coupled to the free ends of both upright arms of said bracket.

10. Device according to claim 1, wherein said device comprises at least one bracket, whose upright arms are both pivoted at said base and whose middle plane forms said plate.

11. Device according to claim 1, wherein the said plate is provided with connecting means with the said support, the said support being provided with means for locking the said connecting means.

12. Device according to the claim 11, in which the said connecting means comprise a plug projecting axially from the said plate, the said support being provided with a locking member comprising an axial cavity for the insertion of the said plug, the said cavity being provided with means for cooperating with the said plug.

13. Device according to claim 1, wherein said device comprises a further plate pivotally connected to the base itself, said further plate being arranged diametrically opposite said at least one plate and being pivoted with respect to a plane orthogonal to the plane of said at least one plate, said further plate being provided with the same inclination adjusting and controlling means.

* * * * *